United States Patent
Han et al.

(10) Patent No.: US 8,432,978 B2
(45) Date of Patent: Apr. 30, 2013

(54) METHOD AND APPARATUS FOR ARRANGING PILOT TONES IN A MOBILE COMMUNICATION SYSTEM

(75) Inventors: Jin-Kyu Han, Suwon-si (KR); Hwan-Joon Kwon, Suwon-si (KR); Dong-Hee Kim, Yongin-si (KR); Youn-Sun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1238 days.

(21) Appl. No.: 11/272,017

(22) Filed: Nov. 14, 2005

(65) Prior Publication Data

US 2006/0098569 A1   May 11, 2006

(30) Foreign Application Priority Data

Nov. 11, 2004   (KR) .................. 10-2004-0092155

(51) Int. Cl.
*H04K 1/10* (2006.01)
*H04J 11/00* (2006.01)

(52) U.S. Cl.
USPC .......................................... 375/260; 370/208

(58) Field of Classification Search .................. 370/208, 370/491, 469; 375/260, 259
See application file for complete search history.

(56) References Cited

U.S. PATENT DOCUMENTS

| 5,923,214 A * | 7/1999 | Mitzlaff ........................... 330/52 |
| RE40,997 E * | 11/2009 | Sunaga .......................... 370/335 |
| 2003/0112066 A1 * | 6/2003 | Posner ............................ 330/52 |
| 2004/0109432 A1 * | 6/2004 | Laroia et al. .................. 370/343 |
| 2004/0120304 A1 * | 6/2004 | Kloos et al. .................... 370/347 |
| 2005/0141626 A1 * | 6/2005 | Lee et al. ....................... 375/260 |
| 2005/0242994 A1 * | 11/2005 | Cobb et al. ..................... 342/386 |
| 2005/0265218 A1 * | 12/2005 | Molisch et al. ................ 370/203 |

FOREIGN PATENT DOCUMENTS

| KR | 2001-0098569 | 11/2001 |
| RU | 2237974 | 10/2004 |
| WO | WO 01/76110 | 10/2001 |

(Continued)

OTHER PUBLICATIONS

Nanying Y., Taewon B., Kiran K., Beyong S.K.: "Enhanced Broadcast-Multicast for HRPD" TSG-C, [Online] Jun. 7, 2004-Jun. 7, 2006), pp. 1-32, XP002368598 Philadelphia, U.S. Retrieved from the Internet: URL:http://ftp.3gpp2.org/TSGC/Workhlg/2004/2004-06-Phila/TSG-C-2004-06-Philadelphia/WG3/C30-20040607-060%20QCOM%20Enhanced%20Broadcast%20Multicast.pdf.*

(Continued)

*Primary Examiner* — David C. Payne
*Assistant Examiner* — Brian J Stevens
(74) *Attorney, Agent, or Firm* — Roylance, Abrams, Berdo and Goodman, LLP

(57) ABSTRACT

An apparatus and method are provided for arranging tones to isolate signals between base stations (BSs) in a high rate packet data (HRPD) system. Packet data is received from a higher layer and the received packet data is channel-coded and modulated. Guard tones are inserted into symbols of the modulated packet data. Pilot tones are inserted using pilot tone arrangements based on preset pilot tone offsets. The packet data symbols to which the pilot tone arrangements have been applied are spread such that BSs for transmitting different broadcast contents are distinguished from each other. A cyclic prefix (CP) is inserted after performing an inverse Fourier transform on the spread packet data symbols, and the symbols are transmitted.

18 Claims, 9 Drawing Sheets

FOREIGN PATENT DOCUMENTS

| | | | |
|---|---|---|---|
| WO | 2004-064295 | | 7/2004 |
| WO | WO 2004/064295 | * | 7/2004 |
| WO | WO 2004-064295 | * | 7/2004 |

OTHER PUBLICATIONS

Fernandez-Getino Garcia, M.J.; Paez-Borrallo, J.M.; Zazo, S.; "Efficient pilot patterns for channel estimation in OFDM systems over HF channels," Vehicular Technology Conference, 1999. VTC 1999—Fall. IEEE VTS 50$^{th}$ vol. 4, Sep. 19-22, 1999, pp. 2193-2197 vol. 4.

Tufvesson, F.; Maseng, T.; "Pilot assisted channel estimation for OFDM in mobile cellular systems," Vehicular Technology Conference, 1997 IEEE 47$^{th}$ vol. 3, May 4-7, 1997, pp. 1639-1643.

Nanying Y., Taewon B., Kiran K., Beyong S.K.: "Enhanced Broadcast-Multicast for HRPD" TSG-C, [Online] Jun. 7, 2004), pp. 1-32, XP002368598 Philadelphia, U.S. Retrieved from the Internet: URL:http://ftp.3gpp2.org/TSGC/Working/2004/2004-06-Phila/TSG-C-2004-06-Philadelphia/WG3/C30-20040607-060%20QCOM%20Enhanced%20Broadcast%20Multicastpdf> [retrieved on Feb. 17, 2006].

* cited by examiner

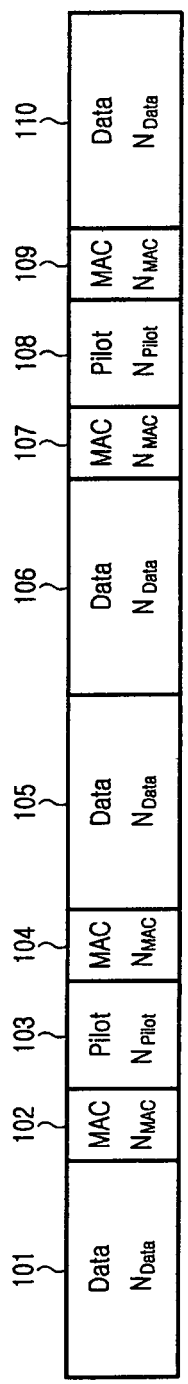
FIG.1
(CONVENTIONAL)

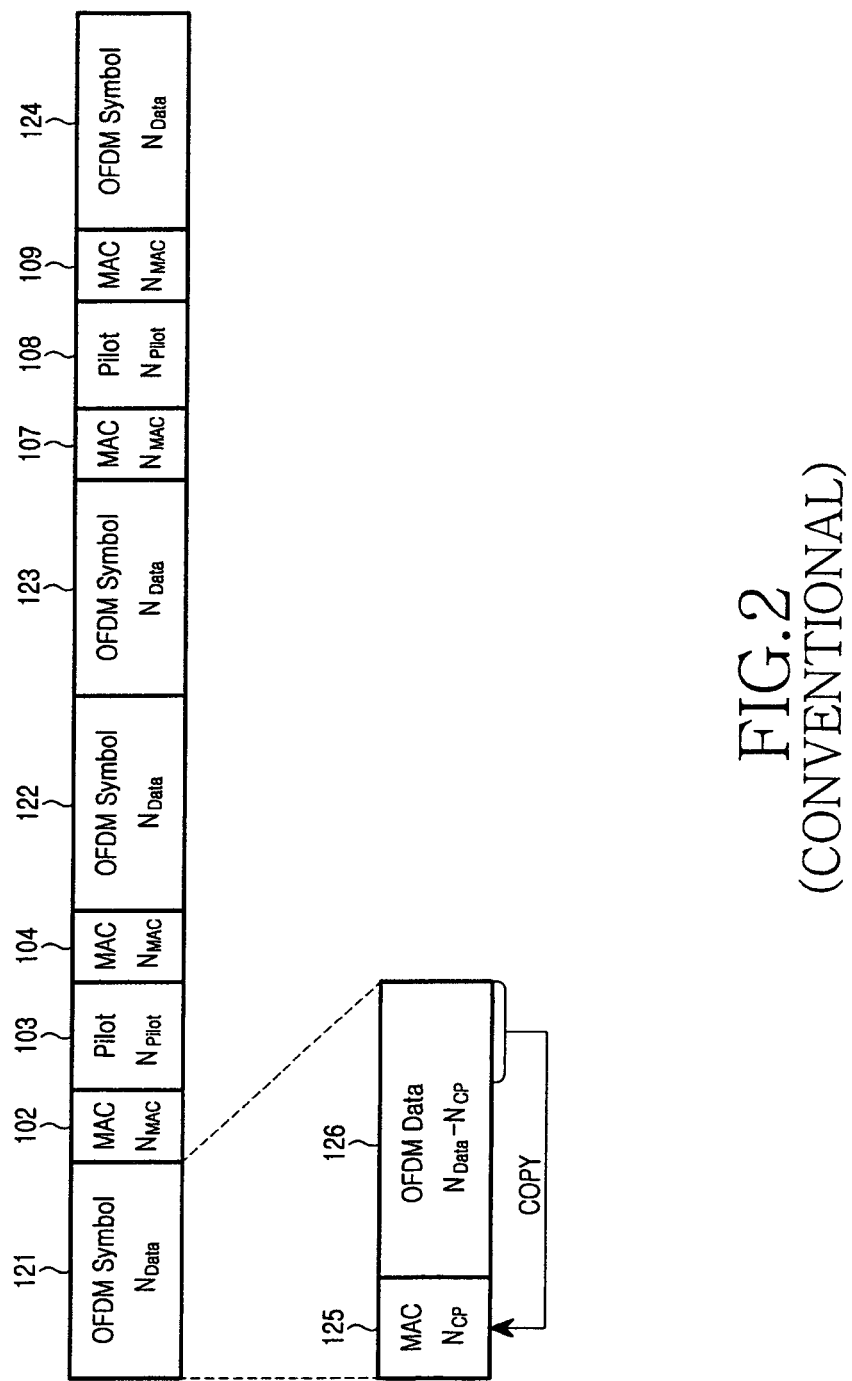
FIG.2
(CONVENTIONAL)

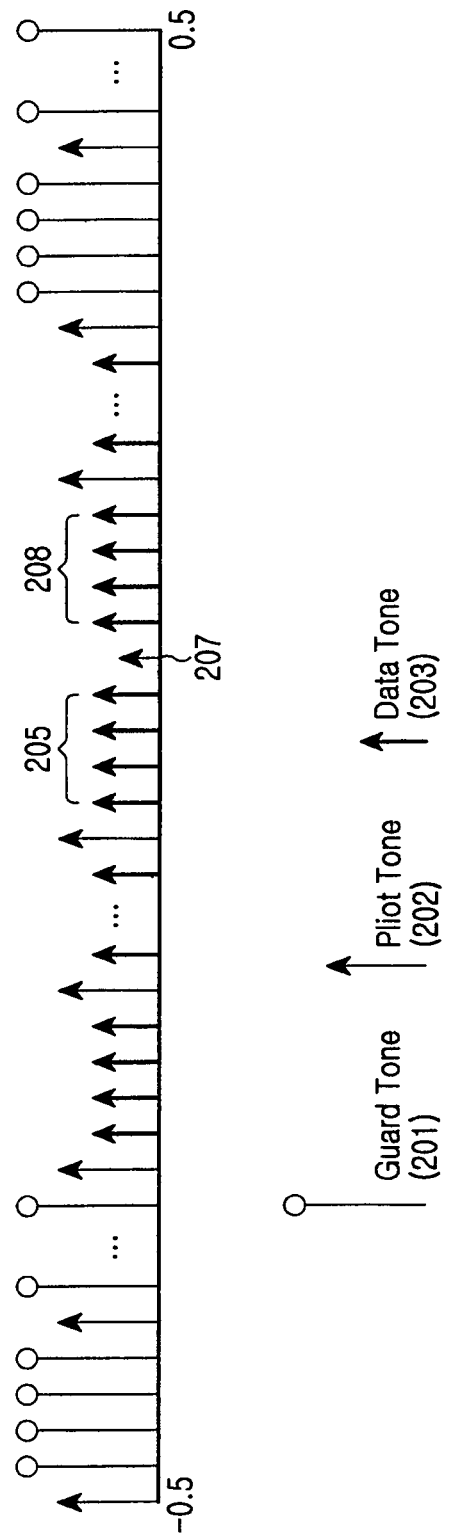
FIG.3
(CONVENTIONAL)

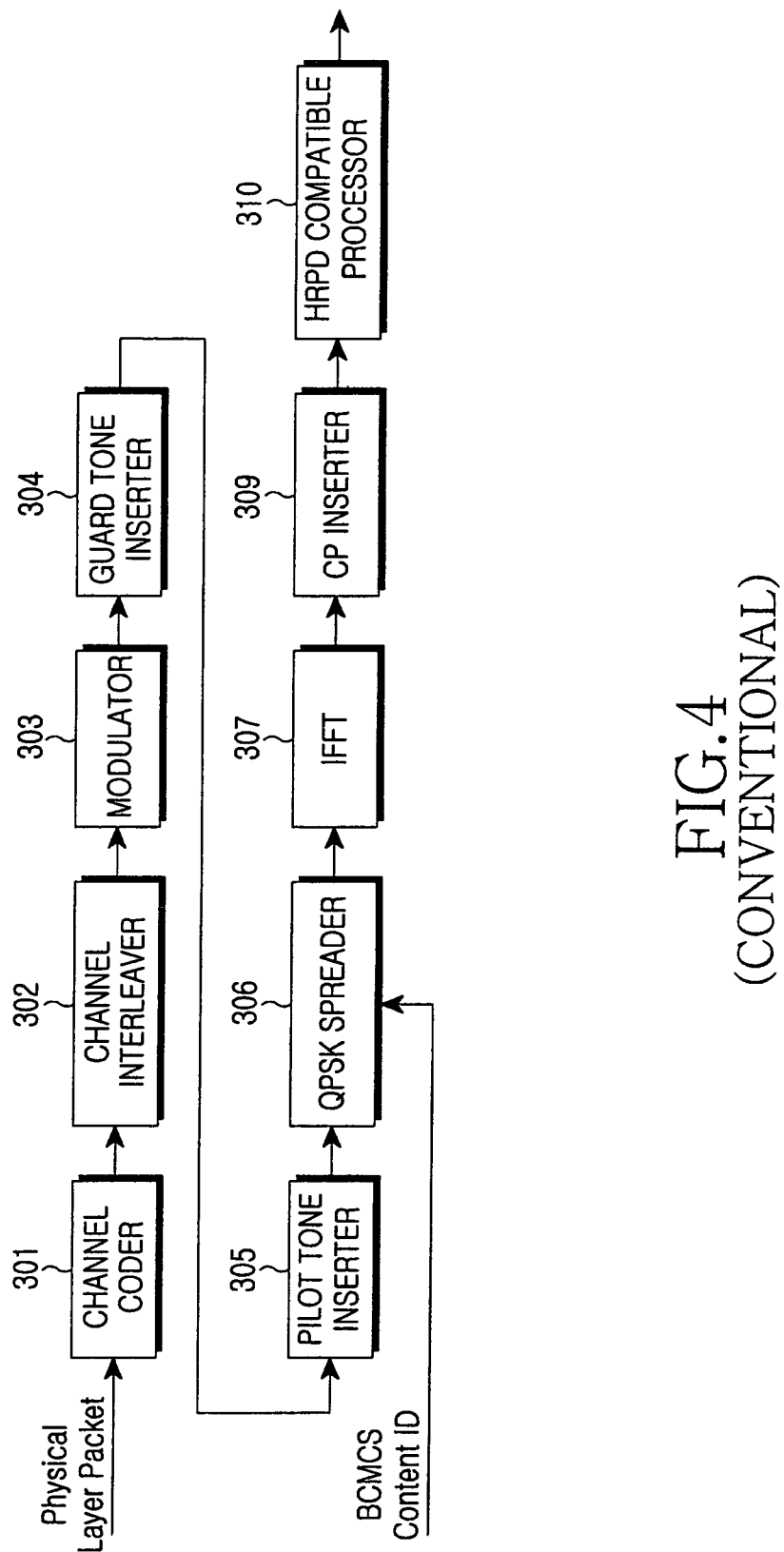
FIG.4
(CONVENTIONAL)

METHOD AND APPARATUS FOR ARRANGING PILOT TONES IN A MOBILE COMMUNICATION SYSTEM

PRIORITY

This application claims the benefit under 35 U.S.C. §119 of a Korean Patent Application Serial No. 2004-92155 filed in the Korean Intellectual Property Office on Nov. 11, 2004, the entire disclosure of which is hereby incorporated by reference.

BACKGROUND OF THE INVENTION

1. Field of the Invention

The present invention generally relates to a method and apparatus for providing a broadcast service in a mobile communication system for providing wireless packets. More particularly, the present invention relates to a method and apparatus for arranging pilot tones in a broadcast system using an orthogonal frequency division multiplexing (OFDM) transmission scheme.

2. Description of the Related Art

Conventional wireless transmission schemes for broadcast and multicast services (BCMCS) have been developed for the purpose of fixed reception and low-speed mobile reception. Recently, technologies capable of receiving the BCMCS using a small-sized terminal in a high-speed mobile environment have been developed. Broadcast technologies such as digital multimedia broadcast (DMB) and digital video broadcast-handheld (DVB-H) have been developed to receive video-level broadcast using a small-sized portable terminal. Furthermore, research for developing the existing unidirectional broadcast service to a bidirectional broadcast service has been conducted. For the bidirectional broadcast service, a method for exploiting the existing wired/wireless communication network as a return channel has been taken into account. Conventional approach has limitations in implementing basic bidirectional broadcasting because broadcasting and communication are used in different transmission modes.

Service supported in the mobile communication system for providing wireless packets is a communication service for exchanging information between a specific transmitter and a specific receiver. In the broadcast service, different receivers receive information through different channels. However, because isolation between channels is low in the wireless mobile communication system, performance is limited due to interference. To increase the isolation between channels, the conventional mobile communication system uses multiple access schemes such as code division multiple access (CDMA), time division multiple access (TDMA), and frequency division multiple access (FDMA) and a cellular concept. However, because these schemes fundamentally cannot suppress interference, interference is still a factor limiting performance.

On the other hand, the BCMCS service different from the communication service uses a scheme for unilaterally transmitting information from a transmitter to a plurality of receivers. Because users receiving identical information share an identical channel, interference between the users does not occur. In case of a mobile broadcast service, interference due to the multipath-fading phenomenon occurring in a high-speed mobile environment is an important factor capable of lowering reception performance. To overcome this problem, many broadcast systems such as digital video broadcast terrestrial (DVB-T), DVB-H, and digital audio broadcast (DAB) use an OFDM transmission scheme.

An advantage of the OFDM transmission scheme in the broadcast system is that self-interference due to multipath fading can be avoided. Specifically, because different base stations (BSs) transmit identical broadcast signals through a single frequency network (SFN) in the broadcast service, the signals can be received from the different BSs through the OFDM transmission scheme without interference. Accordingly, when the OFDM transmission scheme is applied to the broadcast service, an interference-free environment can be implemented, such that transmission efficiency can be maximized.

A forward link of a high rate packet data (HRPD) system uses a TDMA scheme as a multiple access scheme and uses a time division multiplexing/code division multiplexing (TDM/CDM) scheme as a multiplexing scheme.

FIG. 1 illustrates a structure of one slot in which data is transmitted through the forward link of the conventional HRPD system.

As illustrated in FIG. 1, one slot has the form in which a half-slot structure repeats. $N_{Pilot}$-chip pilot parts 103 and 108 are inserted into the centers of the half slots, respectively. These pilot parts 103 and 108 are used to estimate a channel of the forward link in a receiving terminal. $N_{MAC}$-chip medium access control (MAC) information parts 102, 104, 107, and 109 including reverse power control (RPC) information, resource allocation information, and so on are transmitted on both sides of the pilot parts 103 and 108. $N_{Data}$-chip data parts 101, 105, 106, and 110 are transmitted on the sides of the MAC information parts. The pilot, MAC, and data parts are multiplexed according to the TDM scheme such that they are transmitted at different times.

On the other hand, data and MAC information are multiplexed according to the CDM scheme using Walsh codes. In the forward link of the HRPD system, a small block size of the pilot part is set to $N_{Pilot}=96$ chips, a small block size of the MAC part is set to $N_{MAC}=64$ chips, and a small block size of the data part is set to $N_{Data}=400$ chips.

FIG. 2 illustrates a slot structure in which an OFDM block (hereinafter refer to as "OFDM symbol") is inserted into a data transmission interval of an HRPD forward link slot for the BCMCS.

A position and size of a pilot or MAC signal is set to be the same as those of a pilot or MAC signal in the HRPD slot of FIG. 1 such that HRPD forward compatibility can be maintained. That is, $N_{Pilot}$-chip pilot parts 103 and 108 are placed in the centers of the half slots, respectively. $N_{MAC}$-chip MAC information parts 102, 104, 107, and 109 are placed on both sides of the pilot parts. Accordingly, the conventional HRPD terminal not supporting an OFDM-based broadcast service can estimate a channel through a pilot, and can receive an MAC signal. OFDM symbols 121, 122, 123, and 124 are inserted into the remaining parts of the slot, that is, data transmission intervals 101, 105, 106, and 110. These OFDM symbols are modulated BCMCS information.

In the conventional HRPD forward link system, $N_{Data}=400$ chips. Also, a size of an OFDM symbol is $N_{Data}=400$ chips. A cyclic prefix (CP) is placed before the OFDM symbol such that self-interference occurring in a received signal delayed through a multipath can be avoided. That is, one OFDM symbol is configured by OFDM data 126, obtained by performing inverse fast Fourier transform (IFFT) on BCMCS information, and a CP 125. A CP size is $N_{CP}$ chips. The CP is obtained by copying an $N_{CP}$-chip signal from a tail part of the OFDM data and placing the copied signal before the OFDM data. Accordingly, an OFDM data size is ($N_{Data}-N_{CP}$). Here, $N_{CP}$ is determined by an allowable level of a time delay causing self-interference. If $N_{CP}$ is large, a received signal with a large delay is demodulated without interference. However, because an OFDM data size becomes small, an amount of information capable of being transmitted is reduced. On the other hand, if $N_{CP}$ is small, an amount of information capable of being transmitted becomes large but a probability of occurrence of self-interference becomes high, such that reception quality is lowered.

Because identical signals are transmitted from many transmitters in the SFN but a terminal receives the signals at different times, a CP size is conventionally large. In the HRPD forward link system for transmitting an OFDM signal for the BCMCS, it is suitable that $N_{CP}=80$. In this case, an OFDM data size is 320 chips. This means that 320 modulated symbol elements are transmitted in an OFDM data interval after an IFFT. A total of 320 tones can be ensured through the OFDM scheme.

However, all the 320 tones cannot be used for data symbol transmission. Some tones at the edge of a used frequency band must be used as guard tones for reducing interference to an out-of-band signal. Because the pilot parts 103 and 108 used in the conventional HRPD forward link are spread by codes different between transmitters and transmitted, they are not suitable for the purpose of channel estimation for BCMCS provided in the SFN. Accordingly, a dedicated pilot for channel estimation of an OFDM signal is additionally required. A signal preset between the transmitter and the receiver is transmitted in some tones, such that the transmitted signal is used for channel estimation. These tones are referred to as dedicated pilot tones. Because a relatively large time delay is allowed in the OFDM scheme for the SFN, frequency selective fading may be severe. Sufficient pilot tones must be ensured such that channel estimation can be made also in the severe frequency selective fading. Many types of tones are shown in Table 1. Then total number of tones is 320, the number of guard tones is 16, the number of pilot tones is 64, and the number of tones for transmitting data is 240.

TABLE 1

| Total Number of Tones | NData − NCP = 320 |
| --- | --- |
| Number of Guard Tones | NGtone = 16 |
| Number of Pilot Tones | NPTone = 64 |
| Number of Data Tones | NDTone = 240 |

FIG. 3 illustrates a conventional tone arrangement method in the HRPD system.

Referring to FIG. 3, guard tones 201 are placed at a band edge. Eight tones corresponding to a half of the 16 guard tones are placed in a low frequency part of the band, and the remaining 8 guard tones are placed in a high frequency part of the band. Because any signal is not transmitted through the guard tones, power is not allocated to the guard tones. Data tones 203 are placed between guard bands. Because pilot tones 202 are used for the purpose of channel estimation, one pilot tone 202 is placed every 5 tones at an equal interval. Four guard tones subsequent to a pilot tone are placed in the lowest frequency part and then the next pilot tone is inserted subsequent to the guard tones.

Also in an area in which the data tones 203 are placed, four data tones 203 are placed subsequent to an inserted pilot tone 202 and then the next pilot tone 202 is placed subsequent to the data tones 203. When the tones are placed according to this method, the pilot tone 205 is placed in a frequency component corresponding to a direct current (DC) component. Because this pilot tone is the DC tone, power is not allocated or low power is allocated to the pilot tone as compared with other tones. Thus, the pilot tones are transmitted at low power.

An amount of power allocated to the pilot tone 202 is different from that allocated to the data tone 203. Because an optimal solution for a power ratio between the pilot tone 202 and the data tone 203 differs according to a channel state, the transmitter and the receiver must define in advance a ratio value.

FIG. 4 is a block diagram illustrating a structure of a conventional transmitter in an HRPD system.

Referring to FIG. 4, the transmitter includes a channel coder 301 for channel-coding received packet data, a channel interleaver 302 for interleaving the coded packet data, a modulator 303 for modulating the interleaved packet data, a guard tone inserter 304 for inserting a guard tone, and a pilot tone inserter 305 for inserting a pilot tone. The transmitter further includes a quadrature phase shift keying (QPSK) spreader 306, an inverse fast Fourier transform (IFFT) processor 307, a cyclic prefix (CP) inserter 309, and a compatible processor 310.

Physical packet data generated from a higher layer is input to the channel coder 301 and is channel coded. A channel-coded bit stream is interleaved through the channel interleaver 302 such that diversity gain can be obtained. The interleaved bit stream is input to the modulator 303 and is converted to a modulated signal. Here, the modulated signal is placed in the data tones 203.

Then, the signal output from the modulator 303 is input to the guard tone inserter 304. The guard tone inserter 304 places the guard tones 201 at boundaries of the band. The pilot tone inserter 305 places the pilot tones 202 at an equal interval. When a signal to be transmitted is allocated to all tones, a QPSK spread process is performed. Through this spread process, different BCMCS contents to be transmitted from BSs are multiplied by different complex pseudo noise (PN) sequences. Here, the complex PN sequence is a complex sequence in which real and imaginary components are configured by PN codes.

Because a signal of an undesired BS affects a receiver in the form of noise, the receiver separates a channel from the undesired BS and performs channel estimation. A complex PN sequence multiplied in the QPSK spread process is generated after a BCMCS content identifier (ID) is input.

After undergoing the QPSK spread process, the modulated signal is placed in a desired frequency tone position through the IFFT process. After undergoing a process for inserting a CP to prevent the effect of self-interference due to multipath fading, an OFDM signal to be transmitted is completed. Then, the pilot parts 103 and 108 and the MAC information parts 102, 104, 107, and 109 are inserted according to a process of the HRPD transmitter. A signal to be finally transmitted has a slot structure as illustrated in FIG. 2.

However, when a pilot tone is placed according to the conventional method, it is placed in the DC component. In this case, there is a problem in that channel estimation around the DC component is difficult. For example, if power is not allocated to the pilot tone 205 of a DC position, it does not match the original purpose in which a pilot tone is placed every 5 tones at an equal interval. Thus, a channel estimation error in data tones 207 and 208 around the DC component is relatively large as compared with the channel estimation error in other positions. A problem of the channel estimation error occurs even when a small power value is allocated to the pilot tone 205 of a DC position.

SUMMARY OF THE INVENTION

It is, therefore, an object of the present invention to provide a method and system that insert pilot tones at an equal interval without placing a pilot tone in a direct current (DC) frequency in a high rate packet data (HRPD) communication system based on an orthogonal frequency division multiplexing (OFDM) transmission scheme.

It is another object of the present invention to provide a method and system that address a problem of a channel estimation error around a direct current (DC) component by arranging pilot tones according to a predetermined offset value to isolate signals between base stations (BSs) for transmitting different broadcast and multicast services (BCMCS) contents.

The above and other exemplary objects of the present invention can be achieved by a method for arranging tones to isolate signals between base stations (BSs) in a high rate packet data (HRPD) system for a broadcast service, comprising receiving packet data from a higher layer and channel-coding and modulating the received packet data, inserting guard tones into symbols of the modulated packet data, inserting pilot tones using pilot tone arrangements based on preset pilot tone offsets, spreading the packet data symbols to which the pilot tone arrangements have been applied such that BSs for transmitting different broadcast contents are distinguished from each other, and transmitting the spread packet data symbols after performing an inverse Fourier transform.

The above and other exemplary objects of the present invention can also be achieved by an apparatus for arranging tones to isolate signals between base stations (BSs) in a high rate packet data (HRPD) system for a broadcast service, comprising a reception processor for receiving packet data from a higher layer and channel-coding and modulating the received packet data, a guard tone inserter for inserting guard tones into symbols of the modulated packet data, a pilot tone inserter for inserting pilot tones using pilot tone arrangements based on preset pilot tone offsets, and a transmission processor for spreading the packet data symbols to which the pilot tone arrangements have been applied such that BSs for transmitting different broadcast contents are distinguished from each other, inserting a cyclic prefix (CP) after performing an inverse Fourier transform on the spread packet data symbols, and transmitting the symbols.

BRIEF DESCRIPTION OF THE DRAWINGS

The above and other objects and advantages of the present invention will be more clearly understood from the following detailed description taken in conjunction with the accompanying drawings, in which like reference numerals will be understood to refer to like parts, components and structures, where:

FIG. 1 illustrates a slot structure of a forward link in a conventional high rate packet data (HRPD) system;

FIG. 2 illustrates a slot structure in which an orthogonal frequency division multiplexing (OFDM) symbol is inserted into a data transmission interval of an HRPD forward link slot for broadcast and multicast services (BCMCS);

FIG. 3 illustrates a conventional tone arrangement method in the HRPD system;

FIG. 4 is a block diagram illustrating a structure of a conventional transmitter in the HRPD system;

DETAILED DESCRIPTION OF EXEMPLARY EMBODIMENTS

Certain exemplary embodiments of the present invention will be described in detail herein below with reference to the accompanying drawings. In the following description, detailed descriptions of functions and configurations incorporated herein that are well known to those skilled in the art are omitted for clarity and conciseness.

In an embodiment of the present invention, broadcast and multicast services (BCMCS) technology is compatible with a high rate packet data (HRPD) system and is applied to an orthogonal frequency division multiplexing (OFDM) transmission system. The BCMCS technology can be applied to other broadcast systems based on OFDM.

When base stations (BSs) for transmitting different BCMCS contents arrange pilot tones in identical positions, the pilot tones of an undesired BS are reflected in channel estimation. To address this problem, the BSs use a quadrature phase shift keying (QPSK) spread process. Because an undesired BS's signal serving as interference in a pilot tone position can be placed in a data tone if pilot tone positions do not overlap between the BSs for transmitting different BCMCS contents, the receiver can accurately perform channel estimation. Technology using different pilot tone offsets on a BCMCS content-by-BCMCS content basis is useful for efficiently isolating signals between the BSs for transmitting the different BCMCS contents. A tone arrangement method in accordance with an exemplary embodiment of the present invention will be described with reference to the above-described technology. First, a structure of a transmitter for arranging tones in accordance with an exemplary embodiment of the present invention will be described with reference to the accompanying drawing.

Figure 5:
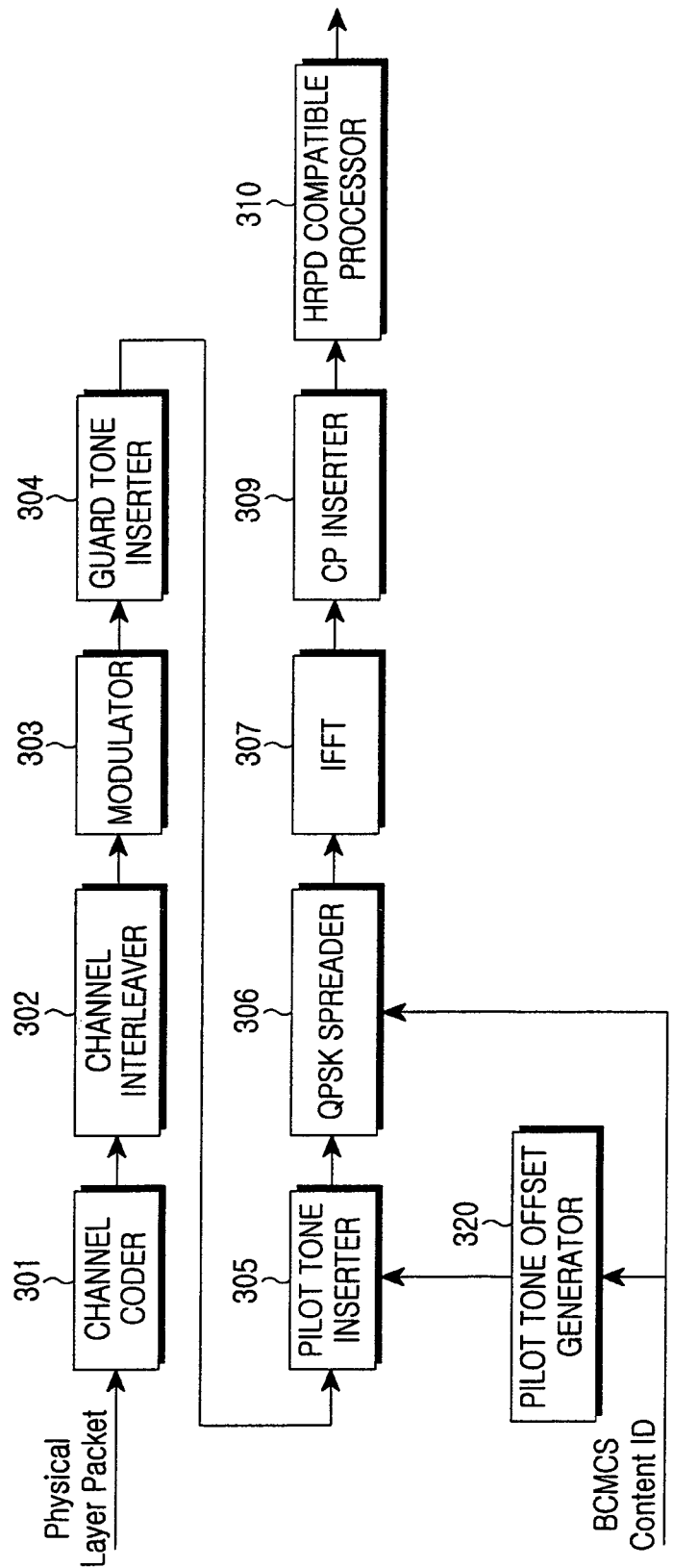
FIG. 5 is a block diagram illustrating a structure of a transmitter in an HRPD system for a broadcast service in accordance with an embodiment of the present invention.

FIG. 5 is a block diagram illustrating a structure of a transmitter in a high rate packet data (HRPD) system for a broadcast service in accordance with an exemplary embodiment of the present invention.

Referring to FIG. 5, the transmitter includes a channel coder 301 for channel-coding received packet data, a channel interleaver 302 for interleaving the coded packet data, a modulator 303 for modulating the interleaved packet data, a guard tone inserter 304 for inserting a guard tone, and a pilot tone inserter 305 for inserting a pilot tone. The transmitter further includes a quadrature phase shift keying (QPSK) spreader 306, an inverse fast Fourier transform (IFFT) processor 307, a cyclic prefix (CP) inserter 309, and a compatible processor 310. Here, a pilot tone offset generator 320 connected to the pilot tone inserter 305 can be added to the transmitter.

The operation of the transmitter with the above-described exemplary structure will be described in more detail with reference to FIG. 5.

Physical packet data generated from a higher layer is input to the channel coder 301 and is channel coded. A channel-coded bit stream is interleaved through the channel interleaver 302 such that diversity gain can be obtained. The interleaved bit stream is input to the modulator 303 and is modulated. Here, the modulated signal is placed in data tones.

Then, the signal output from the modulator 303 is input to the guard tone inserter 304. The guard tone inserter 304 places guard tones at boundaries of the band. The pilot tone inserter 305 places pilot tones at an equal interval. According to a BCMCS content identifier (ID), the pilot tone offset generator 320 generates an offset and varies a pilot tone position. That is, offset values are generated such that OFDM symbols of the BCMCS content have different offset values.

When a signal to be transmitted is allocated to all tones, a QPSK spread process is performed. Through this spread process, different BCMCS contents to be transmitted from base stations (BSs) are multiplied by different complex pseudo noise (PN) sequences. Here, the complex PN sequence is a complex sequence in which real and imaginary components are configured by PN codes. Because a signal of an undesired BS affects a receiver in the form of noise, the receiver separates a channel from the undesired BS and performs channel estimation. A complex PN sequence multiplied in the QPSK spread process is generated after a BCMCS content ID is input.

After undergoing the QPSK spread process, the modulated signal is placed in a desired frequency tone position through an IFFT process. After undergoing a process for inserting a CP to prevent the effect of self-interference due to multipath fading, an OFDM signal to be transmitted is completed. Then, pilot and MAC parts and so on are inserted according to a process of the HRPD transmitter. A signal to be finally transmitted has a slot structure.

As described above, the pilot tone offset depends upon the BCMCS content ID. That is, the BSs use an identical pilot tone offset when they transmit identical BCMCS content, while the BSs use different pilot tone offsets when they transmit different BCMCS contents. Here, the BCMCS content ID is transferred to the QPSK spread process, such that the BSs for transmitting the different BCMCS contents allow different complex PN sequences to be multiplied.

Figure 6:
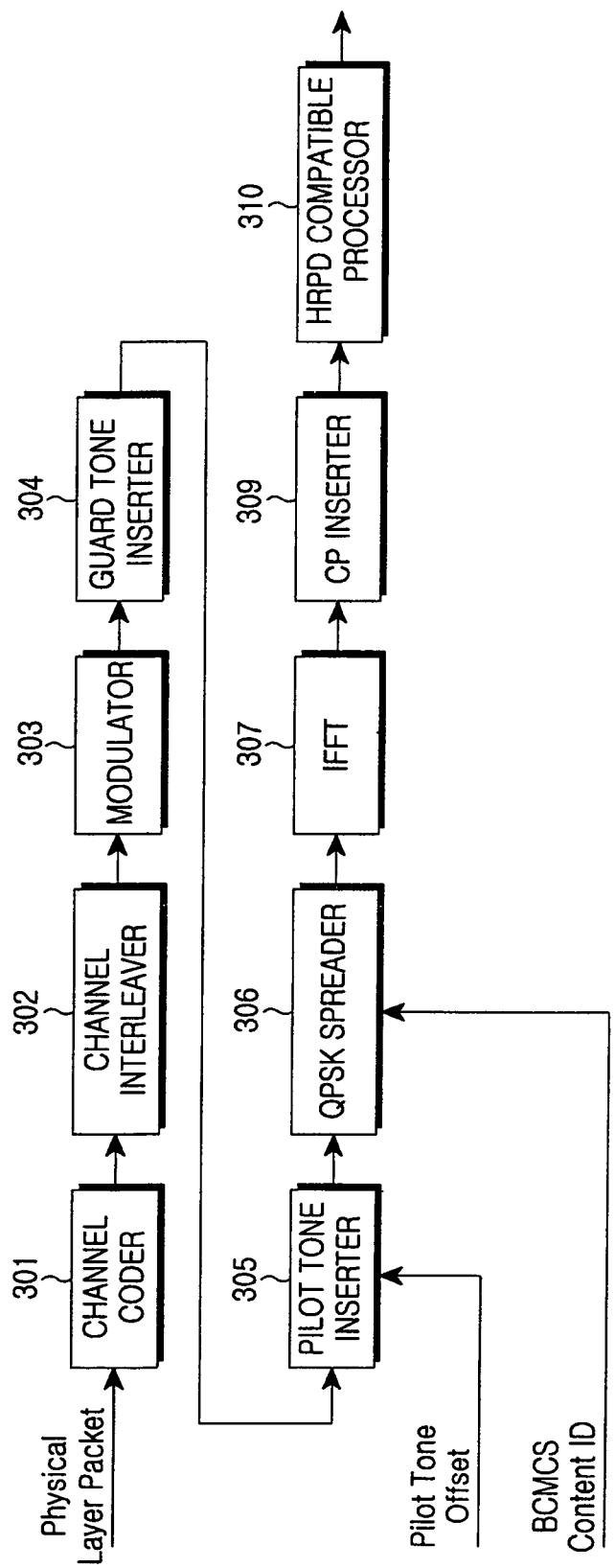
FIG. 6 is a block diagram illustrating a structure of a transmitter in an HRPD system for a broadcast service in accordance with another embodiment of the present invention.

FIG. 6 is a block diagram illustrating a structure of a transmitter in an HRPD system for a broadcast service in accordance with another embodiment of the present invention.

In accordance with the other embodiment of the present invention different from the above-described embodiment, the transmitter is not provided with a special pilot tone offset generator, and inputs a preset pilot tone offset. Furthermore, the other embodiment of the present invention is different from the above-described embodiment in that a higher node such as a base station controller (BSC) for controlling many BSs sets the pilot tone offset and notifies each BS of the set pilot tone offset. Because the transmitter structure in accordance with the other exemplary embodiment of the present invention is similar to that of the above-described exemplary embodiment of the present invention, its description is not repeated here for conciseness.

Exemplary operation of the transmitter with the above-described structure is described below with reference to FIG. 7.

Figure 7:
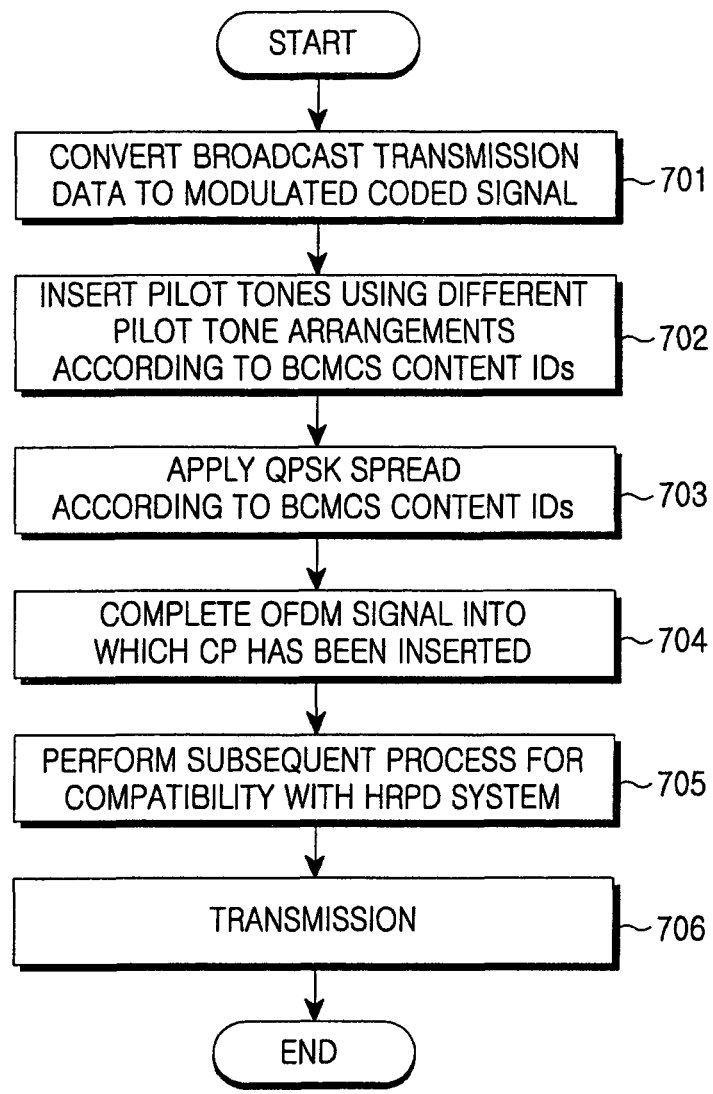
FIG. 7 is a flowchart illustrating the operation of the transmitter in the HRPD system for providing the broadcast service in accordance with an embodiment of the present invention.

FIG. 7 is a flowchart illustrating exemplary operation of the transmitter in the HRPD system for providing a broadcast service in accordance with an embodiment of the present invention.

In step 701, the transmitter channel-codes and interleaves received packet data, and modulates the interleaved packet data. That is, broadcast data to be transmitted is converted to a modulated coded signal.

In step 702, the transmitter uses different pilot tone arrangements according to BCMCS content IDs. When the BCMCS content IDs are different from each other, the pilot tone inserter 305 of FIG. 3 inserts pilot tones at an equal interval such that the pilot tones are placed in different positions.

Then, the transmitter performs different QPSK spread processes according to BCMCS content IDs through the QPSK spreader 306 in step 703. Then, the transmitter performs an IFFT, inserts a CP into an IFFT symbol, and completes an OFDM signal in step 704. Then, the transmitter performs a subsequent process such that it is compatible with the HRPD system through the HRPD compatible processor 310 in step 705. Then, the transmitter sends the completed OFDM signal in step 706.

As described above, an exemplary method for applying a pilot tone offset to an OFDM symbol of a slot to be transmitted from the transmitter and the tone arrangement will be described in more detail with reference to FIG. 8.

Figure 8:
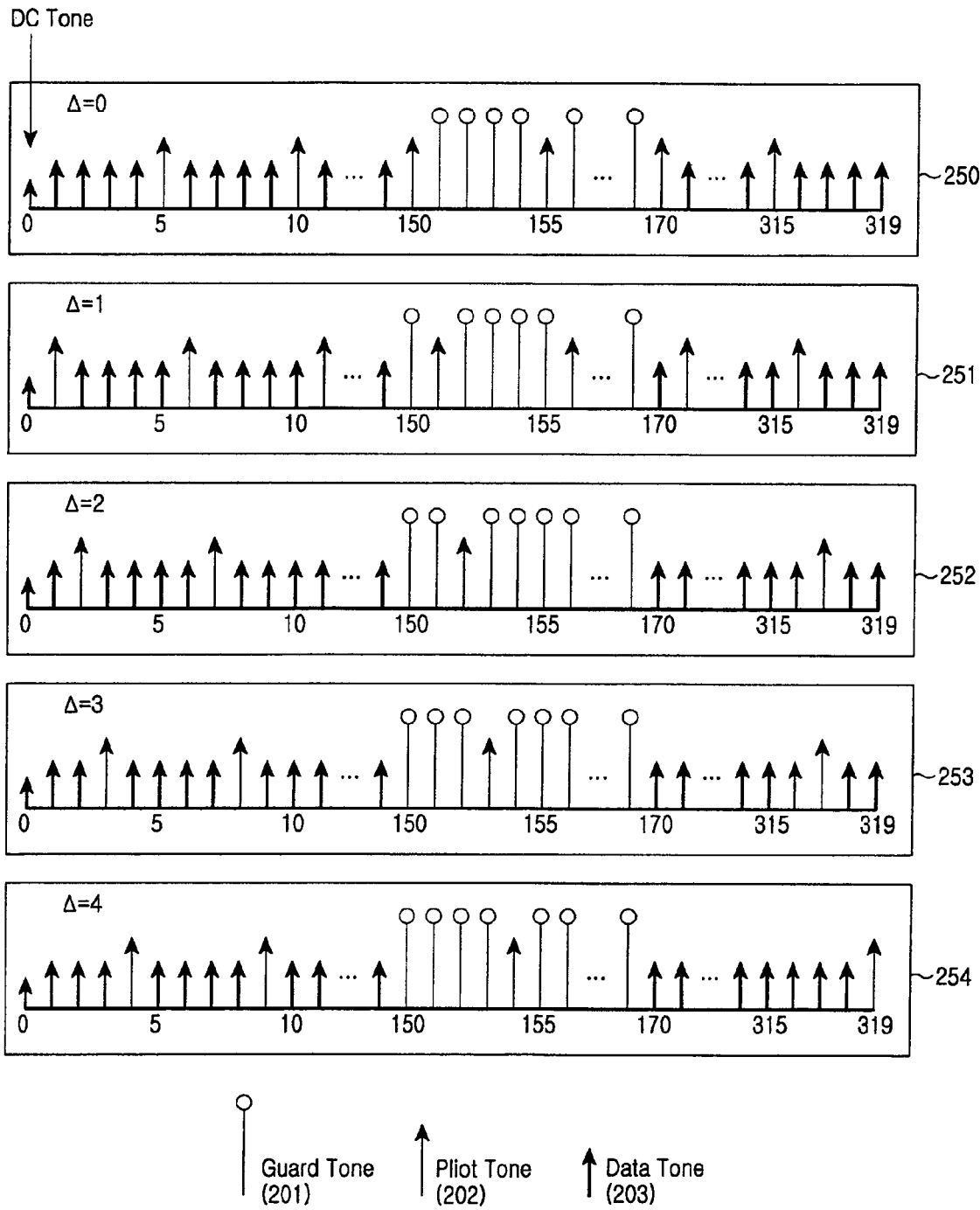
FIG. 8 illustrates a tone arrangement in which a pilot tone offset is reflected in accordance with an embodiment of the present invention.

FIG. 8 illustrates a tone arrangement in which a pilot tone offset is reflected in accordance with an exemplary embodiment of the present invention.

When a radio frequency (RF) signal is transmitted as illustrated in FIG. 8, the $0^{th}$ frequency tone serving as a direct current (DC) tone is placed in the center of the RF signal, and $160^{th}$ to $319^{th}$ frequency tones are shifted to and placed on the left side of the DC tone. That is, the $160^{th}$ to $319^{th}$ frequency tones are placed on the left side of the $0^{th}$ frequency tone, and $1^{st}$ to $159^{th}$ frequency tones are placed on the right side of the $0^{th}$ frequency tone. A parameter $\Delta$ indicates an offset based on a pilot tone arrangement.

Where $\Delta=0$ as indicated by reference numeral 250, the pilot tone arrangement is the same as the conventional pilot tone arrangement. When the tone arrangement as indicated by reference numeral 250 is rearranged in an RF stage, the arrangement as illustrated in FIG. 3 can be obtained. From FIG. 3, it can be found that the pilot tones 202 based on the conventional pilot tone arrangement are placed in frequency tones of multiples of 5.

Reference numerals 251, 252, 253, and 254 of FIG. 8 indicate $\Delta=1$, $\Delta=2$, $\Delta=3$, and $\Delta=4$, respectively.

The pilot tones 202 are placed in frequency tones in which a remainder of division by 5 is $\Delta$. As illustrated in FIG. 8, a data tone 203 rather than the pilot tone 202 is placed in the DC tone when $\Delta$ is a non-zero value. If power is not allocated to the DC tone and no signal is transmitted in the DC tone, it means that one pilot tone is not transmitted in the conventional method but means that one data tone is not transmitted in a method in which a non-zero offset is applied. That is, all 240 data tones are transmitted and 63 pilot tones corresponding to the number of pilot tones reduced by one are transmitted in the conventional method. When a non-zero offset value is applied, all 64 pilot tones are transmitted and 239 data tones corresponding to the number of data tones reduced by one are transmitted.

When the non-zero offset value is applied, one of the exemplary advantage is that the channel estimation accuracy is increased as compared with that of the conventional method. Because a pilot tone is placed in the DC tone in the conventional method, the accuracy of channel estimation around the DC tone is degraded. Because, according to an exemplary embodiment of the present invention, a pilot tone is prevented from being placed in the DC tone, a phenomenon in which the accuracy of channel estimation around the DC tone is degraded can be avoided.

When the non-zero offset value is applied, the number of available offset values is 4, i.e., $\Delta=1$, $\Delta=2$, $\Delta=3$, and $\Delta=4$. The transmitter controls the offset values, such that signals between the BSs for transmitting different BCMCS contents can be distinguished. In accordance with another exemplary embodiment of the present invention, an offset value can be used to distinguish signals between the BSs.

Again referring to FIG. 8, reference numerals 251 and 252 indicate tone arrangements when Δ=1 and Δ=2. From FIG. 8, it can be found that a frequency component used for a pilot tone 202 as indicated by reference numeral 251 is used for a data tone 203 as indicated by reference numeral 252. On the contrary, a frequency component used for a pilot tone 202 as indicated by reference numeral 252 is used for a data tone 203 as indicated by reference numeral 251. When a terminal estimates a channel state associated with a BS using a tone arrangement where Δ=1, only a data tone 203 from a BS using a tone arrangement where Δ=2 serves as interference.

On the other hand, power allocated to the pilot tone 202 is higher than that allocated to the data tone 203 to increase the channel estimation accuracy. Because positions of all pilot tones 202 are identical in the conventional method, interference from BSs for transmitting different BCMCS contents in the channel estimation process occurs due to a collision between the pilot tones 202.

However, when arrangements are set to be different as described above, a collision occurs between pilot and data tones 202 and 203 and the pilot tone 202 serves as interference in the channel estimation. Because the data tone 203 has lower power than the pilot tone 202, an amount of interference in the channel estimation process is reduced, such that the channel estimation accuracy is increased.

The exemplary method for allocating a pilot tone offset will be described in more detail with reference to the accompanying drawing.

Figure 9:
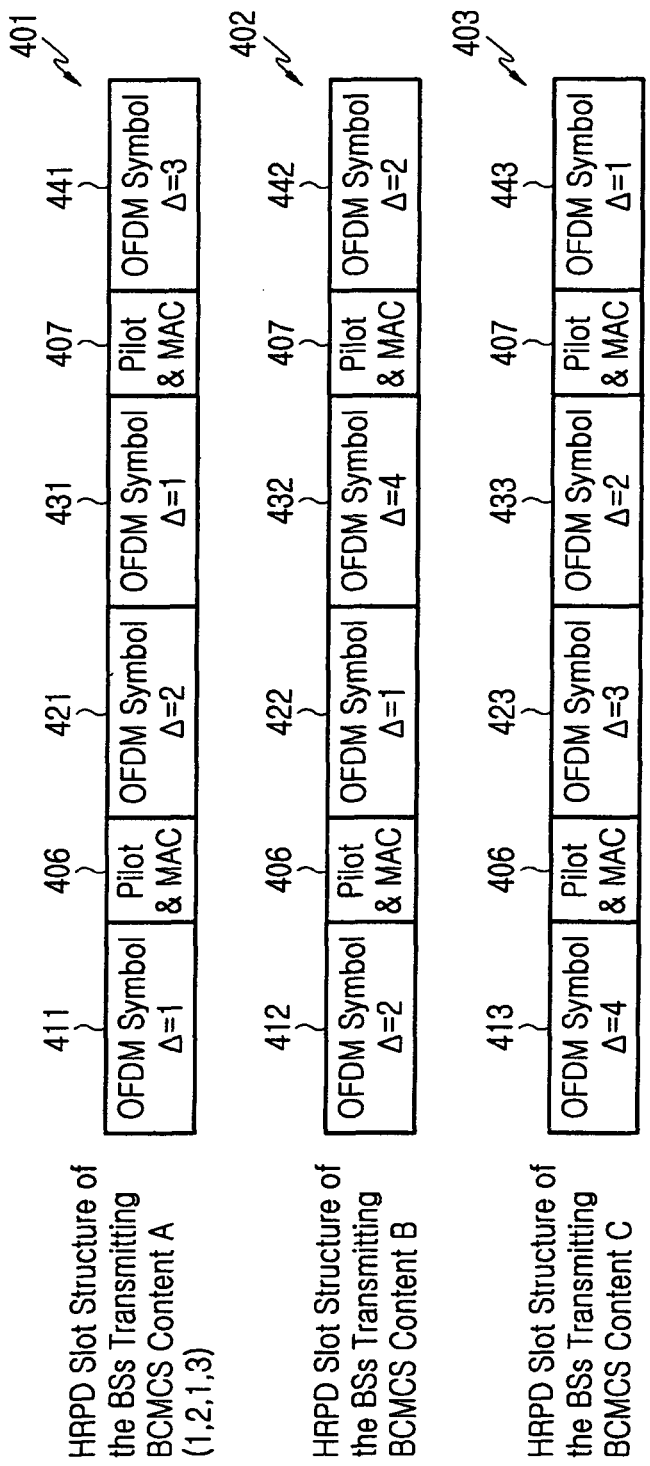
FIG. 9 illustrates an example of a method for arranging pilot tones in accordance with an embodiment of the present invention.

FIG. 9 illustrates an example of a method for arranging pilot tones in accordance with an embodiment of the present invention.

Referring to FIG. 9, Pilot & MAC parts 406 and 407 in a slot correspond to a sum of the pilot parts 103 and 108 and the MAC parts 102, 104, 107, and 109 to be transmitted for the compatibility with the conventional HRPD forward link as illustrated in FIG. 1. OFDM symbols are transmitted in the remaining parts of the slot. Four OFDM symbols are transmitted in one slot.

For example, it is assumed that some BSs transmit BCMCS Content A, some BSs transmit BCMCS Content B, and the remaining BSs transmit in the same slot. In this case, the BSs for transmitting Content A apply Δ=1 to the $1^{st}$ OFDM symbol 411, apply Δ=2 to the $2^{nd}$ OFDM symbol 421, apply Δ=1 to the $3^{rd}$ OFDM symbol 431, and apply Δ=3 to the $4^{th}$ OFDM symbol 441. The BSs for transmitting Content B apply Δ=2 to the $1^{st}$ OFDM symbol 412, apply Δ=1 to the $2^{nd}$ OFDM symbol 422, apply Δ=4 to the $3^{rd}$ OFDM symbol 432, and apply Δ=2 to the $4^{th}$ OFDM symbol 442. The BSs for transmitting Content C apply Δ=4 to the $1^{st}$ OFDM symbol 413, apply Δ=3 to the $2^{nd}$ OFDM symbol 423, apply Δ=2 to the $3^{rd}$ OFDM symbol 433, and apply Δ=1 to the $4^{th}$ OFDM symbol 443.

Referring to the $1^{st}$ OFDM symbol as illustrated in FIG. 9, the BSs for transmitting Content A use Δ=1, the BSs for transmitting Content B use Δ=2, and the BSs for transmitting Content C use Δ=4. The BSs for transmitting different contents arrange the pilot tones 202 in different positions. When contents to be transmitted are different, different pilot tone offsets are set for the remaining OFDM symbols, such that a collision between pilot tones can be prevented.

As is apparent from the above description, according to exemplary implementations of the present invention, pilot tones are arranged in different positions between base stations (BSs) for transmitting different contents, thereby preventing a collision between the pilot tones and maximizing transmission efficiency.

Although certain exemplary embodiments of the present invention have been disclosed for illustrative purposes, those skilled in the art will appreciate that various modifications, additions, and substitutions are possible, without departing from the scope of the present invention which is defined by the following claims, along with full scope of their equivalents.

What is claimed is:

1. A method for arranging tones in a tone sequence in a high rate packet data system for a broadcast service, the method comprising the steps of:
   receiving packet data from a higher layer and modulating the received packet data;
   inserting guard tones into the modulated packet data;
   inserting pilot tones into the modulated packet data based on a pilot tone offset, the pilot tone offset being an offset of a position in the tone sequence in the modulated packet data, where one of the pilot tones is inserted in the tone sequence according to a pilot tone arrangement, from a reference position in the tone sequence; and
   transmitting packet data into which the pilot tones have been inserted,
   wherein the pilot tone offset is differently applied according to broadcast service content in the same slot, and
   wherein the step of inserting the pilot tones comprises applying the pilot tone offset, wherein the pilot tones are not placed in a direct current (DC) frequency, and wherein the pilot tones are placed at an equal interval.

2. The method of claim 1, further comprising:
   determining the pilot tone offset by broadcast service content; and
   generating the pilot tone offset from a pilot tone offset generator.

3. The method of claim 1, wherein the pilot tone offset is set, and the pilot tone offset is transmitted to receiver.

4. The method of claim 1, wherein the step of inserting the pilot tones comprises applying different pilot tone offset between OFDM blocks of one slot.

5. The method of claim 1, wherein a value of the pilot tone offset is non-zero.

6. A method, for arranging tones in a high rate packet data system for a broadcast service, the method comprising the steps of:
   receiving packet data from a higher layer and modulating the received packet data;
   inserting guard tones into the modulated packet data;
   inserting pilot tones into the modulated packet data based on a pilot tone offset; and
   transmitting packet data into which the pilot tones have been inserted;
   wherein the step of inserting the pilot tones comprises applying the pilot tone offset,
   wherein the pilot tones are not placed in a direct current (DC) frequency, and wherein the pilot tones are placed at an equal interval;
   the method further comprising, when a radio frequency (RF) signal is transmitted:
   placing a DC tone serving as a $0^{th}$ frequency tone in a center of a radio frequency (RF) signal;
   shifting $160^{th}$ to $319^{th}$ frequency tones to a left side of the DC tone; and
   placing the $160^{th}$ to $319^{th}$ frequency tones on the left side of the DC tone.

7. An apparatus for arranging tones in a tone sequence in a high rate packet data system for a broadcast service, the apparatus comprising:

a reception processor for receiving packet data from a higher layer and modulating the received packet data;

a guard tone inserter for inserting guard tones into the modulated packet data;

a pilot tone inserter for inserting pilot tones into the modulated packet data based on a pilot tone offset, the pilot tone offset being an offset of a position in the tone sequence in the modulated packet data, where one of the pilot tones is inserted in the tone sequence according to a pilot tone arrangement, from a reference position in the tone sequence; and a transmission processor for transmitting packet data into which the pilot tones have been inserted, wherein the pilot tone offset is differently applied according to broadcast service content in the same slot, and wherein the pilot tone inserter applies the pilot tone offset, wherein the pilot tones are not placed in a direct current (DC) frequency, and wherein the pilot tones are placed at an equal interval.

8. The apparatus of claim 7, further comprising:

a pilot tone offset generator for setting and generating the pilot tone offset for packet data into which the guard and pilot tones have been inserted according to broadcast service content.

9. The apparatus of claim 7, wherein the pilot tone offset is set and the pilot tone offset is transmitted to receiver.

10. The apparatus of claim 7, wherein the pilot tone inserter applies different pilot tone offset between OFDM blocks of one slot.

11. The apparatus of claim 7, wherein a value of the pilot tone offset is non-zero.

12. An apparatus, for arranging tones in a high rate packet data system for a broadcast service, the apparatus comprising:

a reception processor for receiving packet data from a higher layer and modulating the received packet data;

a guard tone inserter for inserting guard tones into the modulated packet data;

a pilot tone inserter for inserting pilot tones into the modulated packet data based on pilot tone offset; and a transmission processor for transmitting packet data into which the pilot tones have been inserted;

wherein the pilot tone inserter applies the pilot tone offset, wherein the pilot tones are not placed in a direct current (DC) frequency, and wherein the pilot tones are placed at an equal interval; and wherein when a radio frequency (RF) signal is transmitted, a DC tone serving as a $0^{th}$ frequency tone is placed in a center of a radio frequency (RF) signal, $160^{th}$ to $319^{th}$ frequency tones are shifted to a left side of the DC tone, and the $160^{th}$ to $319^{th}$ frequency tones are placed on the left side of the DC tone.

13. A method for transmitting packet data of a base station (BS) in a high rate packet data system for a broadcast service, the method comprising the steps of:

receiving packet data from a higher layer and modulating the received packet data;

generating pilot tones for channel estimation;

differently arranging the pilot tones in a tone sequence based on a pilot tone offset generated according to broadcast service content in the same slot, the pilot tone offset being an offset of a position in the tone sequence, where one of the pilot tones is inserted in the tone sequence according to a pilot tone arrangement, from a reference position in the tone sequence; and transmitting packet data in which pilot tones have been arranged, wherein the step of inserting the pilot tones comprises applying the pilot tone offset, wherein the pilot tones are not placed in a direct current (DC) frequency, and wherein the pilot tones are placed at an equal interval.

14. The method of claim 13, wherein the step of arranging the pilot tones comprises applying different pilot tone offset between OFDM blocks of one slot.

15. The method of claim 13, wherein a value of the pilot tone offset is non-zero.

16. An apparatus for transmitting packet data of a base station (BS) in a high rate packet data system for a broadcast service, the apparatus comprising:

a reception processor for receiving packet data from a higher layer and modulating the received packet data;

a pilot tone generator for generating pilot tones for channel estimation;

a pilot tone inserter for differently arranging the pilot tones in a tone sequence based on a pilot tone offset generated according to broadcast service content in the same slot, the pilot tone offset being an offset of a position in the tone sequence, where one of the pilot tones is inserted in the tone sequence according to a pilot tone arrangement, from a reference position in the tone sequence; and a transmission processor for transmitting packet data in which the pilot tones have been arranged, wherein the inserting of the pilot tones comprises applying the pilot tone offset, wherein the pilot tones are not placed in a direct current (DC) frequency, and wherein the pilot tones are placed at an equal interval.

17. The apparatus of claim 16, wherein the pilot tone inserter applies different pilot tone offset between OFDM blocks of one slot.

18. The apparatus of claim 16, wherein a value of the pilot tone offset is non-zero.

* * * * *